(12) United States Patent
Ma

(10) Patent No.: US 12,055,740 B2
(45) Date of Patent: Aug. 6, 2024

(54) MULTILAYER OPTICAL THIN FILM STRUCTURE

(71) Applicant: National Research Council of Canada, Ottawa (CA)

(72) Inventor: Penghui Ma, Ottawa (CA)

(73) Assignee: National Research Council of Canada, Ottawa (CA)

( * ) Notice: Subject to any disclaimer, the term of this patent is extended or adjusted under 35 U.S.C. 154(b) by 945 days.

(21) Appl. No.: 17/045,005

(22) PCT Filed: Apr. 3, 2019

(86) PCT No.: PCT/CA2019/050408
§ 371 (c)(1),
(2) Date: Oct. 2, 2020

(87) PCT Pub. No.: WO2019/191841
PCT Pub. Date: Oct. 10, 2019

(65) Prior Publication Data
US 2021/0165147 A1      Jun. 3, 2021

Related U.S. Application Data

(60) Provisional application No. 62/653,383, filed on Apr. 5, 2018.

(51) Int. Cl.
*G02B 5/28* (2006.01)
*B42D 25/29* (2014.01)
(Continued)

(52) U.S. Cl.
CPC ............. *G02B 5/285* (2013.01); *B42D 25/36* (2014.10); *G02B 5/22* (2013.01); *B42D 25/29* (2014.10)

(58) Field of Classification Search
None
See application file for complete search history.

(56) References Cited

U.S. PATENT DOCUMENTS 3,858,977 A    1/1975  Baird et al.
4,705,356 A   11/1987  Berning et al.
(Continued)

FOREIGN PATENT DOCUMENTS

CN    100373188 C    3/2008
EP     0927371 B1   10/2002
EP     1762398 B1    4/2014

OTHER PUBLICATIONS

"Communication—Extended European Search Report" from the European Patent Office for corresponding European Application No. EP19780662.3-1020, dated Nov. 29, 2021, 10 pages.
(Continued)

*Primary Examiner* — Robert E. Tallman
(74) *Attorney, Agent, or Firm* — Klarquist Sparkman, LLP

(57) ABSTRACT

There is described a multilayer optical thin film structure comprising multiple optically absorbing layers and multiple optically non-absorbing layers. The optically absorbing layers and the optically non-absorbing layers are configured such that light incident on the structure is reflected with a red colour at a first angle, and light incident on the structure is reflected with a yellow colour at a second angle. There is also described an item having applied thereto such a multilayer structure.

25 Claims, 6 Drawing Sheets

(51) Int. Cl.
  *B42D 25/36*  (2014.01)
  *G02B 5/22*   (2006.01)

(56) References Cited

U.S. PATENT DOCUMENTS

| | | | |
|---|---|---|---|
| 4,779,898 | A | 10/1988 | Berning et al. |
| 4,930,866 | A | 6/1990 | Berning et al. |
| 5,009,486 | A | 4/1991 | Dobrowolski et al. |
| 6,157,489 | A | 12/2000 | Bradley, Jr. et al. |
| 6,686,042 | B1 | 2/2004 | LeGallee |
| 7,064,897 | B2 | 6/2006 | Hebrink et al. |
| 7,744,987 | B2 | 6/2010 | Hebrink et al. |
| 9,274,258 | B2 | 3/2016 | Fuhse et al. |
| 2003/0190473 | A1* | 10/2003 | Argoitia ............... G02B 5/1861 428/402 |
| 2006/0097514 | A1 | 5/2006 | Nishimura et al. |
| 2011/0226147 | A1 | 9/2011 | Tarantoul et al. |

OTHER PUBLICATIONS

Office Action (including English translation) from The Intellectual Property Office of Taiwan, for Taiwan Patent Application No. 108112215, dated Jan. 7, 2023, 12 pages.
International Search Report and Written Opinion of the International Searching Authority, mailed Jun. 14, 2019, for corresponding International Application No. PCT/CA2019/050408, 8 pages.
Dobrowolski et al., "Optical Interference Coatings for Inhibiting of Counterfeiting," Optica Acta, 1973, vol. 20. 12, pp. 925-937.
Dobrowolski et al., "Research on thin film anticounterfeiting coatings at the National Research Council of Canada," vol. 28, pp. 2702-2717, 1989.
http://hyperphysics.phy-astr.gsu.edu/hbase/vision/cie.html, obtained Mar. 27, 2018, 5 pages.
https://en.wikipedia.org/wiki/CIE_1931_color_space, obtained Mar. 27, 2018, 13 pages.
https://en.wikipedia.org/wiki/Hue, obtained Mar. 27, 2018, 5 pages.

* cited by examiner

MULTILAYER OPTICAL THIN FILM STRUCTURE

CROSS REFERENCE TO RELATED APPLICATIONS

This is the U.S. National Stage of International Application No. PCT/CA2019/050408, filed Apr. 3, 2019, which in turn claims the benefit of U.S. Provisional Application No. 62/653,383, filed Apr. 5, 2018. The provisional application is incorporated herein by reference in its entirety.

FIELD OF THE DISCLOSURE

The present disclosure relates to a multilayer optical thin film structure and to an item incorporating the same.

BACKGROUND TO THE DISCLOSURE

Optical thin film security devices (referred to as OTFSDs) are known devices used for anti-counterfeiting of items such as banks notes and high-value documents. Typically, an OTFSD comprises a layered structure configured such that light incident on the layered structure is reflected from the structure with a particular wavelength or range of wavelengths. Due to the interference effect, the colour perceived from the light reflected off the structure varies as a function of the angle with which the OTFSD is viewed. The colourful fringes observed on soap bubbles or oil patches on water are simple examples of the interference effect.

OTFSDs are still popular on major bank notes. For example, compared with other optically variable devices, the optical effect of OTFSDs is more defined and is easier to be identified by a common user. In practice, all one needs to do to verify the authenticity of an item to which is applied an OTFSD is tilt the item and observe whether during the titling the colour of the item (i.e. the colour of the ambient light reflected off the item) varies from one specific colour to another specific colour. Other types of commonly used optically variable devices generally do not exhibit such a well-defined colour changing scheme. Taking for example a holographic security device, while the images produced by such a device can show intense colours and colour variation under certain lighting conditions, it can be difficult, even for an expert, to predict and explain the observed colours and colour variation. Consequently, it would be even more difficult for a layperson to recognize that a holographic device on a banknote may be much different from that on a sticker applied to a cheap consumer good, for example.

Furthermore, the lighting conditions suitable for observation of OTFSDs tend to be broader than those for other types of optically variable devices. In particular, the colour variation exhibited by an OTFSD is better observed in an environment of diffused light, such as in a brightly lit shopping mall, paned offices and rooms, or even on a street. In contrast, the ideal lighting conditions for diffraction-based security devices are bright point sources, such as would be found in a theatre or a night bar where surroundings are often painted in dark colours and with dotted lights. It is also more difficult and less economical for a counterfeiter to replicate OTFSDs or mimic their effect.

The present disclosure seeks to provide an improved OTFSD.

SUMMARY OF THE DISCLOSURE

In a first aspect of the disclosure, there is provided a multilayer optical thin film structure comprising: multiple optically absorbing layers; and multiple optically non-absorbing layers. The optically absorbing layers and the optically non-absorbing layers are configured such that light incident on the structure is reflected with a red colour at a first angle, and light incident on the structure is reflected with a yellow colour at a second angle. Accordingly, a new OTFSD is proposed, and in particular one in which the optical thin film structure exhibits a red-to-yellow colour variation.

Light having a red colour may be light whose dominant wavelength is about 610 nm to about 740 nm. Light having a yellow colour may be light whose dominant wavelength is about 570 nm to about 590 nm. For example, for some angles of observation the colour yellow may comprise the colour gold which includes a yellow hue.

An optically absorbing layer may be a layer configured to absorb one or more wavelengths of visible light (i.e. light in the range of 400 nm-700 nm).

An optically non-absorbing layer may be a layer having negligible absorption with respect to visible light (i.e. light in the range of 400 nm-700 nm).

The optically absorbing layers may comprise semiconducting layers.

The optically absorbing layers may comprise one or more of a metal (such as for example tantalum), a metal alloy, a metalloid (such as for example amorphous silicon or germanium), and a nitride.

The optically non-absorbing layers may comprise one or more of silicon oxide, aluminium oxide, magnesium fluoride, an oxide, an oxynitride, and a fluorite.

The optical thin film structure may further comprise a bonding layer for bonding the structure to a substrate.

The optical thin film structure may comprise at least three optically absorbing layers and at least three optically non-absorbing layers.

The optical thin film structure may further comprise a substrate to which are applied the optically absorbing layers and the optically non-absorbing layers.

The optically absorbing layers and the optically non-absorbing layers may be arranged in alternating order. In some embodiments, two or more optically non-absorbing layers may be directly adjacent one another.

The optical thin film structure may further comprise an optically reflecting layer. The optically reflecting layer may be configured such that visible light incident on the optically reflecting layer is substantially not transmitted through the optically reflecting layer, and may be configured such that reflection of visible light is relatively high. For example, the thickness of the optically reflecting layer may be sufficient as to prevent transmission of incident visible light through the reflecting layer. In some embodiments, the optically reflecting layer (for example a metal of high reflectance) comprises a thickness of at least 20 nm, or for example a thickness in the range 20 nm-50 nm.

The optically reflecting layer may comprise a substrate to which is applied the stack of optically non-absorbing and optically absorbing layers.

The optically reflecting layer may be a layer configured to reflect at least some wavelengths of visible light (i.e. light in the 400 nm-700 nm range). In some embodiments, the optically reflecting layer may be configured to reflect all wavelengths of visible light.

The optical thin film structure may comprise at least three optically non-absorbing layers. In some embodiments the optical thin film structure may comprise at least three optically absorbing layers.

The optically absorbing layers and the optically non-absorbing layers may be arranged to form a stack, and the optically reflecting layer may be arranged at an end of the stack. One of the optically absorbing layers may comprise the optically reflecting layer. For example, one of the optically absorbing layers may act as both an absorbing layer and a reflecting layer configured to reflect at least some wavelengths of, or all wavelengths of, visible light.

The optically absorbing layers and the optically non-absorbing layers may be positioned on one side of the optically reflecting layer and form a set of layers, and the optical thin film structure may further comprise an identical set of layers positioned on an opposite side of the optically reflecting layer.

The optically reflecting layer may comprise one or more of a metal (for example a metal having a suitably high reflectance), a metal alloy, aluminium, silver, gold, chromium, nickel, and tantalum.

At least one of the optically absorbing layers may comprises amorphous silicon and at least one of the optically non-absorbing layers comprises silicon dioxide.

At least one of the optically absorbing layers may comprise germanium and at least one of the optically non-absorbing layers may comprise silicon dioxide.

The optically reflecting layer may comprise aluminium, at least one of the optically absorbing layers may comprise tantalum, and at least one of the optically non-absorbing layers may comprise silicon dioxide.

The optically reflecting layer may comprise aluminium, at least one of the optically absorbing layers may comprise a nitride, such as chromium nitride, and at least one of the optically non-absorbing layers may comprise silicon dioxide.

The optically reflecting layer may comprise aluminium, at least one of the optically absorbing layers may comprise germanium, and at least one of the optically non-absorbing layers may comprise silicon dioxide.

The optically reflecting layer may comprise chromium, at least one of the optically absorbing layers may comprise amorphous silicon, and at least one of the optically non-absorbing layers may comprise silicon dioxide.

The first angle may be comprised between about 0 degrees relative to a normal to a plane defined by the structure, and about 28 degrees relative to the normal to the plane. The second angle may be comprised between about 45 degrees relative to the normal to the plane, and about 80 degrees relative to the normal to the plane.

The optically absorbing layers and the optically non-absorbing layers may be further configured such that, as an angle of reflection of light incident on the structure varies from the first angle to the second angle, a degree of yellow in the reflected light increases and a degree of red in the reflected light decreases.

The optically non-absorbing layers may comprise dielectric layers.

The optical thin film structure may be incorporated into an item (such as a bank note) in the form of a patch, stripes, thread, and/or ink flakes. For instance, the optical thin film structure may be formed on a patch which is then incorporated into the item to be protected, or may be incorporated into a thread which is then woven or stitched into the item to be protected.

In a further aspect of the disclosure, there is provided a method of securing an item so as to inhibit or prevent counterfeiting of the item. The method comprises applying to the item any of the above-described multilayer optical thin film structures.

In a further aspect of the disclosure, there is provided a method of authenticating an item having applied thereto any of the above-described multilayer optical thin film structures. The method comprises observing at a first angle light with a red colour reflected off the item, and observing at a second angle light with a yellow colour reflected off the item.

In a further aspect of the disclosure, there is provided an item having applied thereto any of the above-described multilayer optical thin film structures. The item may comprise one or more of a bank note, a document, a passport, an identification card, a bank card, and a valuable good.

BRIEF DESCRIPTION OF THE DRAWINGS

Specific embodiments of the disclosure will now be described in conjunction with the accompanying drawings of which.

DETAILED DESCRIPTION

The present disclosure seeks to provide an improved multilayer optical thin film structure. While various embodiments of the disclosure are described below, the disclosure is not limited to these embodiments, and variations of these embodiments may well fall within the scope of the disclosure which is to be limited only by the appended claims.

Directional terms such as "top", "bottom", "upwards", "downwards", "vertically" and "laterally" are used in this disclosure for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this disclosure are intended to include indirect and direct connections unless otherwise indicated. For example, if a first article is coupled to a second article, that coupling may be through a direct connection or through an indirect connection via one or more other articles.

Furthermore, the singular forms "a", "an", and "the" as used in this disclosure are intended to include the plural forms as well, unless the context clearly indicates otherwise.

Still further, the term "adjacent" is to be considered as encompassing both indirectly adjacent and directly adjacent, unless otherwise stated or implied. When two elements or layers are said to be indirectly adjacent one another, then one or more intervening elements or layers may separate the two elements or layers. On the other hand, when two elements or layers are said to be directly adjacent one another, then the two elements or layers are in direct physical contact with one another.

As used herein, a reference to "about" or "approximately" a number or to being "substantially" equal to a number means being within +/−10% of that number.

Embodiments of the disclosure are directed at multilayer optical thin film structures or devices. The devices are configured to exhibit a red-to-yellow colour variation when observed at different angles. In order to achieve such a colour variation, the devices comprise a layered structure of optically non-absorbing layers and optically absorbing layers. The specific thicknesses and number of the optically non-absorbing layers and optically absorbing layers, and the specific materials used to form the layers, may be controlled so as to achieve the desired red-to-yellow colour variation. In the following embodiments, the optically non-absorbing layers are dielectric layers, although other optically non-absorbing layers may be used without departing from the scope of the disclosure.

Figure 1:
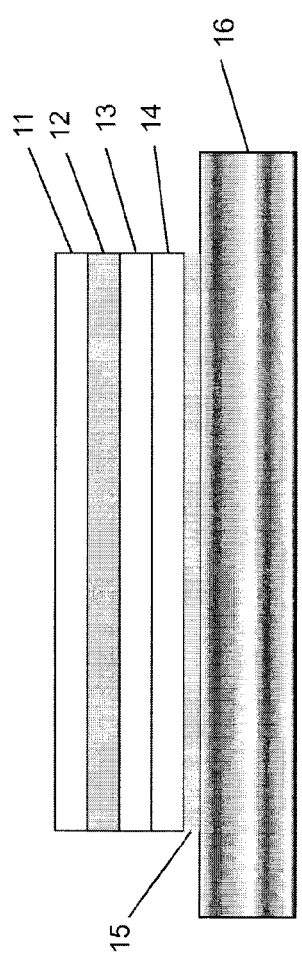
FIG. 1 is a schematic diagram of a multilayer optical thin film structure, according to an embodiment of the disclosure.

Turning to FIG. 1, there is shown a first embodiment of a multilayer optical thin film structure or device 10. Device 10 comprises a number of layers arranged in a stacked formation. In particular, device 10 comprises a first dielectric layer 11 positioned on top of and adjacent a first optically absorbing layer 12. Optically absorbing layer 12 is positioned on top of and adjacent a second dielectric layer 13. Second dielectric layer 13 is positioned on top of and adjacent an optically absorbing and reflecting layer 14 (which may simply be referred to as optically reflecting layer 14). A bonding layer 15 is used to adhere or bond the stacked arrangement of layers 11, 12, 13, 14 to a substrate 16. In some embodiments, there is no need for bonding layer 15 and the stacked arrangement of layers 11, 12, 13, 14 may be deposited directly on substrate 16.

While FIG. 1 shows each of the illustrated layers being directly adjacent one another such that each layer is in physical contact with at least one other layer, in other embodiments additional intermediary layers may be provided to device 10. Furthermore, device 10 may comprise an additional number of dielectric and/or optically absorbing layers, for example as set out in some of the embodiments described below. The total number of layers, the material used for each layer, and the thickness of each layer may vary in order to achieve a device configured such that light incident on the device is reflected with a red colour at a first angle, and light incident on the structure is reflected with a yellow colour at a second angle.

Optically absorbing layer 12 may comprise various materials including, but not limited to, metals, metal alloys, nitrides (such as Cr nitrides and other metal nitrides such as Nb or Ta nitrides), amorphous silicon, germanium, and tantalum. Dielectric layers 11, 13 may comprise various materials including, but not limited to, silicon dioxide, aluminium oxide, magnesium fluoride, oxides, and fluorite. Optically reflecting layer 14 may comprise a metal including, but not limited to, aluminium, chromium, and a metal alloy.

According to embodiments of the disclosure, the following materials and thicknesses were used in the fabrication of devices according to device 10. In these examples, the method of deposition of the layers comprised sputtering.

It should be noted that, in all of the following examples (Examples 1a-5), the actual thickness of each layer depends on the method of deposition used. The followings thicknesses are therefore purely exemplary in nature, and other layered structures may achieve the same optical colour variation with different thicknesses of layers, assuming for example that the layers were formed using other, different types of deposition techniques.

Example 1a

| Layer | Thickness (nm) | Material |
| --- | --- | --- |
| 14 | 20 or more | Al |
| 13 | 223.7 | SiO$_2$ |
| 12 | 14.5 | Ta |
| 11 | 235.8 | SiO$_2$ |

Example 1b

| Layer | Thickness (nm) | Material |
| --- | --- | --- |
| 14 | 20 or more | Al |
| 13 | 206.3 | SiO$_2$ |
| 12 | 20.9 | CrN$_x$ |
| 11 | 240.6 | SiO$_2$ |

According to another embodiment of the disclosure, the following materials and thicknesses were used in the fabrication of a device according to device 10. In this example, the method of deposition of the layers comprised sputtering.

Example 2

| Layer | Thickness (nm) | Material |
| --- | --- | --- |
| 14 | 20 or more | Al |
| 13 | 204 | SiO$_2$ |
| 12 | 7.9 | Ge |
| 11 | 77.4 | SiO$_2$ |

Figure 2:
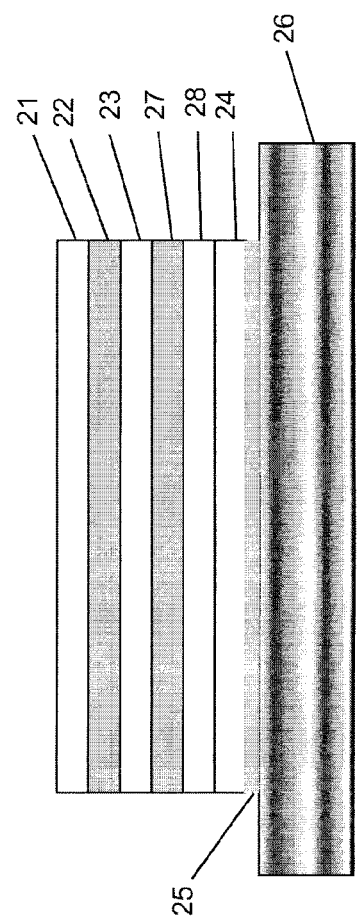
FIG. 2 is a schematic diagram of a multilayer optical thin film structure, according to an embodiment of the disclosure.

Turning to FIG. 2, there is shown another embodiment of multilayer optical thin film structure or device 20. Device 20 is similar to device 10 and like features are numbered using like reference numbers. Unlike device 10, device 20 includes an additional optically absorbing layer 27 positioned between dielectric layer 23 and an additional dielectric layer 28. The optically absorbing and reflecting layer 24 is positioned between bonding layer 25 and dielectric layer 28.

According to another embodiment of the disclosure, the following materials and thicknesses were used in the fabrication of a device according to device 20. In this example, the method of deposition of the layers comprised sputtering.

Example 3

| Layer | Thickness (nm) | Material |
|---|---|---|
| 24 | 20 or more | Cr |
| 28 | 179.8 | SiO$_2$ |
| 27 | 19.8 | a-Si |
| 23 | 203.4 | SiO$_2$ |
| 22 | 6.8 | a-Si |
| 21 | 90 | SiO$_2$ |

Light incident on the device 10, 20 via dielectric layer 11, 21 travels through the stacked arrangement and is reflected at each interface separating adjacent layers. An observer will observe light reflected off the device 10, 20, such light being the complex summation (or interference) of the light having undergone multiple reflections/transmissions at each interface separating adjacent layers. The observed light is therefore a result of the collective effect of each individual layer of the multilayer stack. An observer will observe the colour variation by positioning themselves on the same side of substrate 16, 26 as the side from which light is incident on the device 10, 20.

Figure 3:
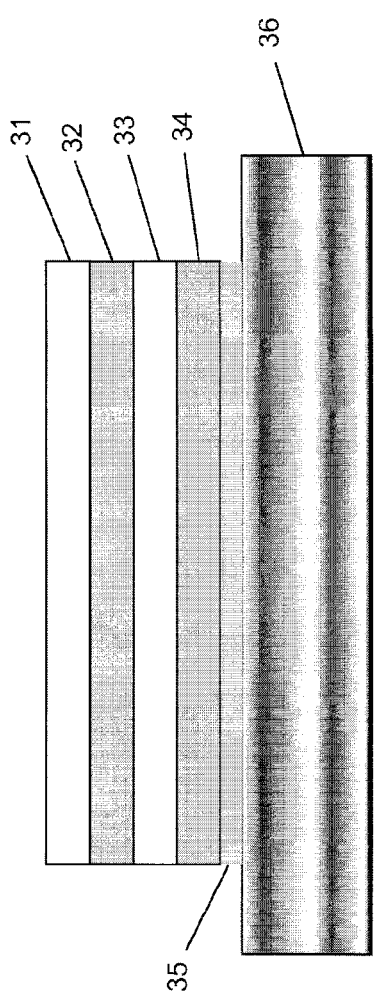
FIG. 3 is a schematic diagram of a multilayer optical thin film structure, according to an embodiment of the disclosure.

Turning to FIG. 3, there is shown another embodiment of a multilayer optical thin film structure or device 30. Device 30 comprises a number of layers arranged in a stacked formation. In particular, device 30 comprises a first dielectric layer 31 positioned on top of and adjacent a first optically absorbing layer 32. Optically absorbing layer 32 is positioned on top of and adjacent a second dielectric layer 33. Second dielectric layer 33 is positioned on top of and adjacent a second optically absorbing layer 34. A bonding layer 35 is used to adhere or bond the stacked arrangement of layers 31, 32, 33, 34 to a transparent substrate 36 (for example a plastic bank note). In some embodiments, there is no need for bonding layer 15 and the stacked arrangement of layers 31, 32, 33, 34 may be deposited directly on transparent substrate 36.

Similarly to the embodiments of FIGS. 1 and 2, optically absorbing layers 32, 24 may comprise various materials including, but not limited to, metals, metal alloys, nitrides, amorphous silicon, germanium, tantalum, and semiconducting materials. Dielectric layers 31, 33 may comprise various materials including, but not limited to, silicon dioxide, aluminium oxide, magnesium fluoride, nitrides, oxides, and fluorite.

According to another embodiment of the disclosure, the following materials and thicknesses were used in the fabrication of a device according to device 30. In this example, the method of deposition of the layers comprised sputtering.

Example 4

| Layer | Thickness (nm) | Material |
|---|---|---|
| 34 | 26.9 | Ge |
| 33 | 213.7 | SiO$_2$ |
| 32 | 7.1 | Ge |
| 34 | 74.4 | SiO$_2$ |

Figure 4:
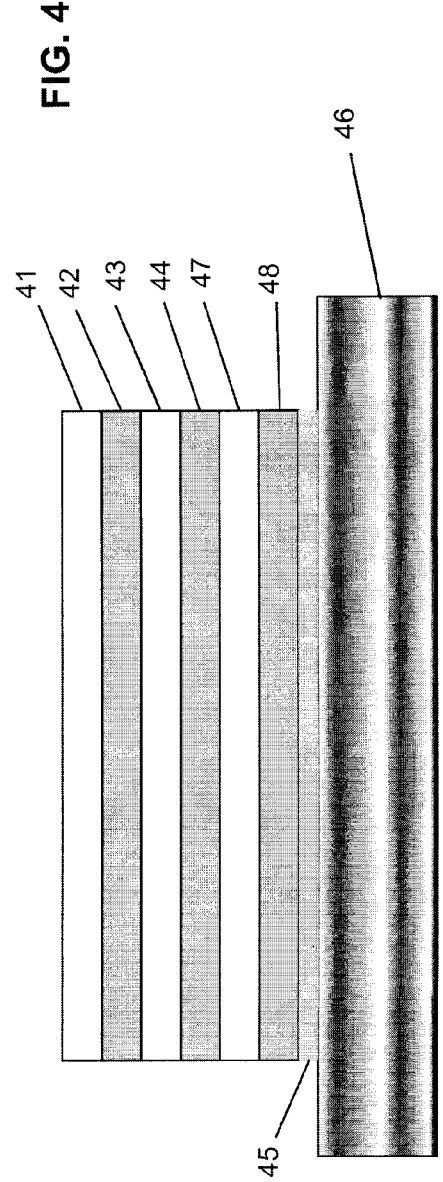
FIG. 4 is a schematic diagram of a multilayer optical thin film structure, according to an embodiment of the disclosure.

Turning to FIG. 4, there is shown another embodiment of multilayer optical thin film structure or device 40. Device 40 is similar to device 30 and like features are numbered using like reference numbers. Unlike device 30, device 40 includes an additional dielectric layer 47 positioned between optically absorbing layer 44 and an additional optically absorbing layer 48 adhered to a transparent substrate 46 (for example a plastic bank note) via a bonding layer 45.

According to another embodiment of the disclosure, the following materials and thicknesses were used in the fabrication of a device according to device 40. In this example, the method of deposition of the layers comprised sputtering.

Example 5

| Layer | Thickness (nm) | Material |
|---|---|---|
| 48 | 47.4 | a-Si |
| 47 | 184.3 | SiO$_2$ |
| 44 | 11.4 | a-Si |
| 43 | 206.2 | SiO$_2$ |
| 42 | 6.9 | a-Si |
| 41 | 96.1 | SiO$_2$ |

Devices according to the embodiments of FIGS. 3 and 4 are configured to function similarly to those of the embodiments of FIGS. 1 and 2. In particular, light incident on the device 30, 40 via dielectric layer 31, 41 travels through the stacked arrangement and is reflected at each interface separating adjacent layers. An observer will observe light reflected off the device 30, 40, such light being the complex summation (or interference) of the light having undergone multiple reflections/transmissions at each interface separating adjacent layers. The observed light is therefore a result of the collective effect of each individual layer of the multilayer stack. An observer will observe the colour variation by positioning themselves on the same side of substrate 36, 46 as the side from which light is incident on the device 10, 20.

Figure 5:
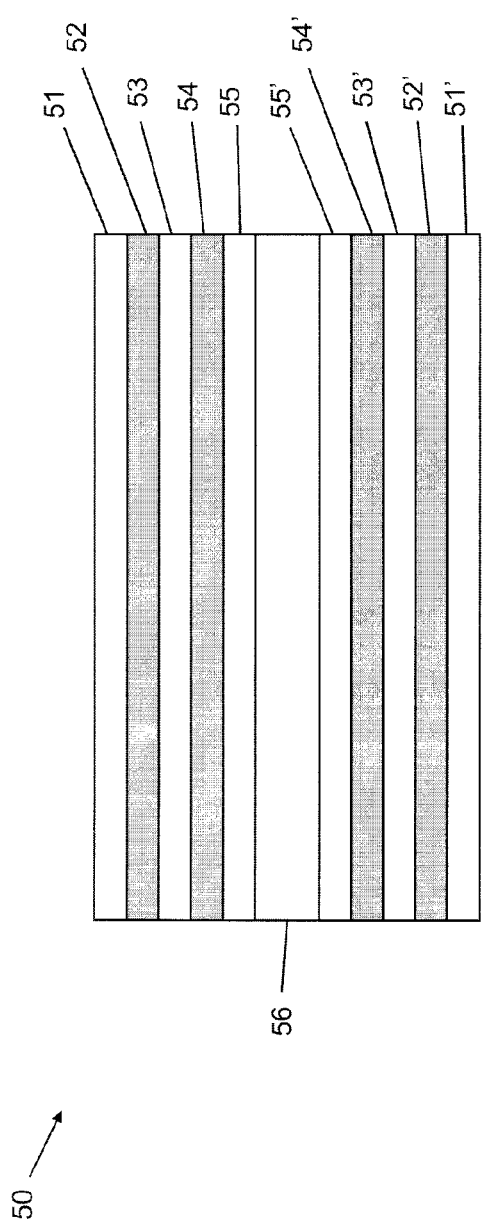
FIG. 5 is a schematic diagram of a multilayer optical thin film structure, according to an embodiment of the disclosure.

Turning to FIG. 5, there is shown another embodiment of multilayer optical thin film structure or device 50. Device 50 comprises a number of layers arranged in a stacked formation. In particular, device 50 comprises a first dielectric layer 51 positioned on top of and adjacent a first optically absorbing layer 52. Optically absorbing layer 52 is positioned on top of and adjacent a second dielectric layer 53. Second dielectric layer 53 is positioned on top of and adjacent a second optically absorbing layer 54. Second optically absorbing layer 54 is positioned on top of and adjacent a third dielectric layer 55. Beneath third dielectric layer 55 is positioned an optically reflecting layer 56. The stacked arrangement of alternating dielectric and optically absorbing layers is repeated on the other side of the optically reflecting layer 56.

Similarly to the embodiments of FIGS. 1-4, optically absorbing layers 52, 54 may comprise various materials including, but not limited to, metals, metal alloys, nitrides, amorphous silicon, germanium, and tantalum. Dielectric layers 51, 53 may comprise various materials including, but not limited to, silicon dioxide, aluminium oxide, magnesium fluoride, metal oxides and metal fluorite.

Optically reflecting layer 56 is sufficiently thick that substantially no light is transmitted through it. Accordingly, the red-to-yellow colour variation may therefore be perceived on either side of device 50. The embodiment of FIG. 5 is particularly suited to ink pigment applications. Specifically, the multilayer device 50 may be crushed into small pieces and mixed with an ink carrier for printing.

In each of the described embodiments, the layers may be deposited using one or more of a variety of deposition techniques, as known in the art. Such techniques include, but are not limited to, evaporation, vacuum coating, sputtering, a sol-gel process, and printing. The multilayer structure may be deposited on a substrate to be applied to an item to be protected, or alternatively may be deposited directly to objects to be protected, in which case the item to be protected acts as the substrate. In some embodiments, the multilayer structure may be crushed into small flakes to be used as an ink pigment.

In each of the described embodiments, the optically absorbing layers and the dielectric layers are arranged in alternating order to form a stack, and (in the cases where one is used) the optically reflecting layer is arranged at an end of the stack. The reflection of light at the interface of two layers is greater the more the materials making up the adjacent layers differ. Accordingly, alternating the layers of the multilayer stack may enable improved reflection of the light.

In some embodiments, two or more optically non-absorbing layers may be directly adjacent one another, and/or two or more optically absorbing layers may be directly adjacent one another. Furthermore, the multilayer structure may comprise more optically absorbing layers than non-absorbing layers, or more non-absorbing layers than absorbing layers.

Figure 6:
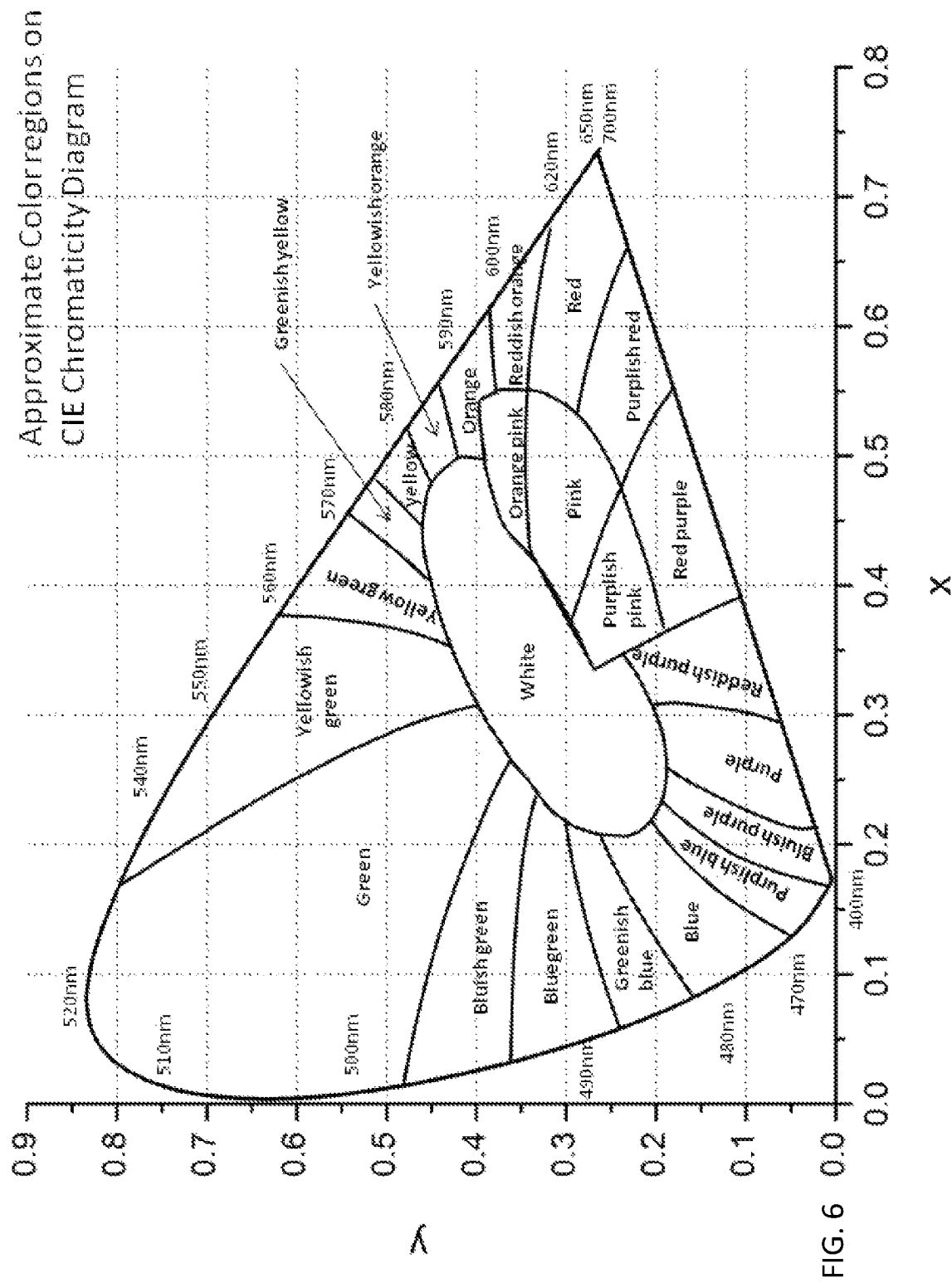
FIG. 6 is a CIE chromaticity diagram of approximate colour regions (obtained from http://hyperphysics.phy-astr.gsu.edu/hbase/vision/cie.html)

Turning to FIG. 6, there is shown a CIE 1931 chromaticity diagram. Generally, colours that can be perceived by the human eye are shown in the horseshoe-shaped colour space. Each colour corresponds to a point (x,y) in the diagram. Spectral colors (i.e. colours of single wavelength) are located on the outer boundary of the colour space. Colours of multiple wavelengths are those points inside the colour space. If a point is closer to the outer boundary, its corresponding colour may be considered purer or more saturated. The middle of the horseshoe corresponds to a mixed colour of white, black and grey. It should be noted that the regions shown in the colour space are approximate.

Figure 7:
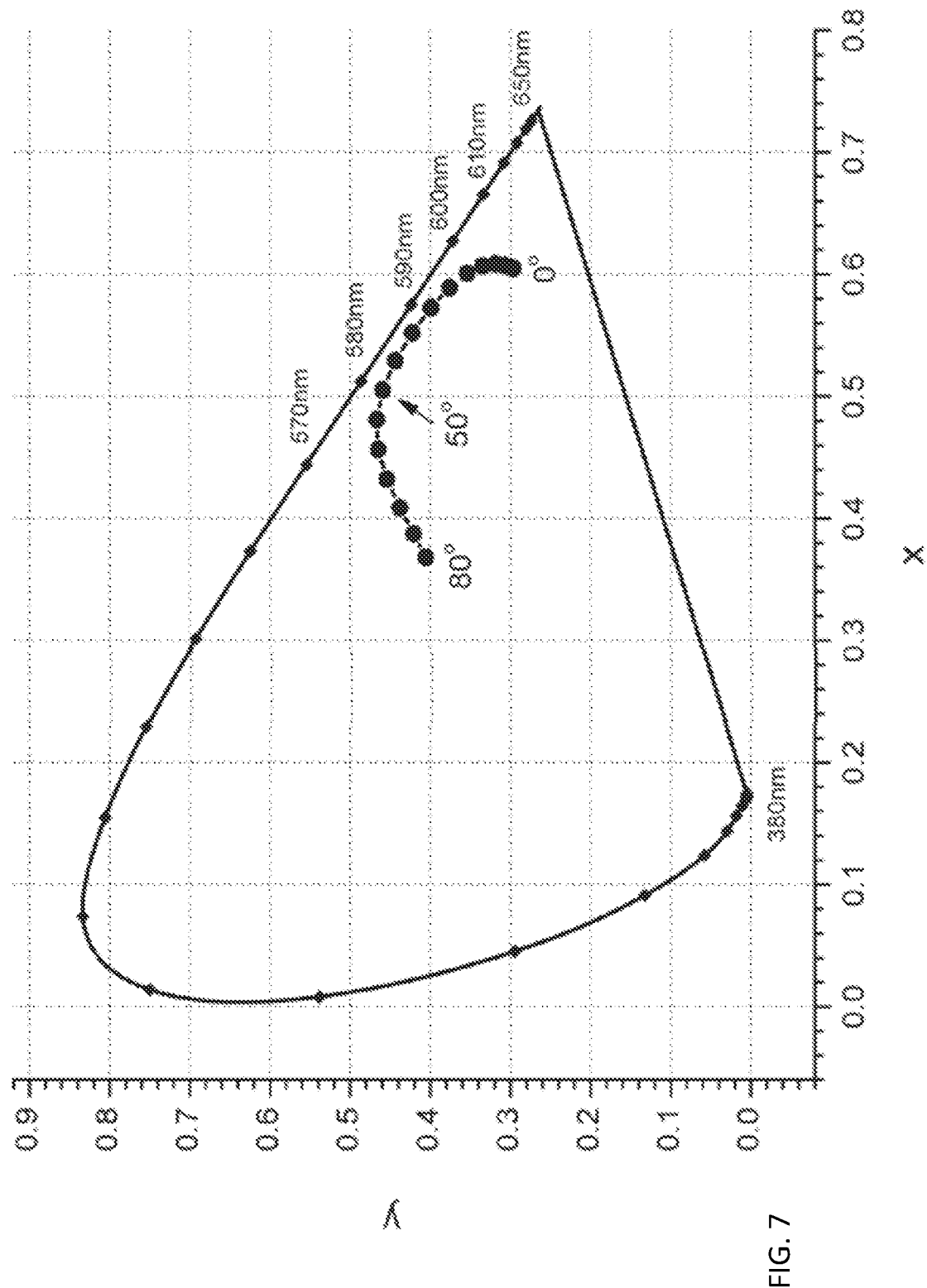
FIG. 7 is a CIE chromaticity diagram showing, as a function of angle of reflection, the colour of light reflected off the multilayer optical thin film structures described herein.

By tailoring the thickness and material of each of the dielectric, absorbing, and reflecting layers of the above embodiments, as well as the total number of layers used to form the multilayer device, it is possible to form an optical thin film structure or device that exhibits a specific red-to-yellow colour variation under different viewing angles. In particular, FIG. 7 shows the desired red-to-yellow colour variation under different viewing angles. As can be seen, at an angle of about 0 degrees relative to a normal to a plane defined by the device (e.g. roughly normal to the layers comprising the device), light reflected off the device has a predominantly red colour. The red colour persists for viewing angles (i.e. angles of reflection) up to about 28 degrees to the normal to the plane, whereupon the colour changes relatively quickly to predominantly yellow, over an approximate 15 degree viewing angle range, from about 28 degrees relative to the normal to the plane to about 45 degrees relative to the normal to the plane. From about 45 degrees relative to the normal to the plane to about 80 degrees relative to the normal to the plane, the reflected light is predominantly of yellow colour. Two adjacent points have a 5 degree difference of angle of observation.

Current OTFSDs generally have a relatively narrow range of observation angles in order for each specified colour to be perceived. For example, the current popular three-layer yellow-to-green OTFSD typically has a 10 to 15 degree window for each of the yellow and green colours it reflects. Outside of these 10-15 degree windows, the device exhibits different colours (other than yellow or green). On the other hand, according to embodiments of the present disclosure, the angular ranges for the specified colours of red and yellow are expanded. Thus, even for relatively high angles of observation (e.g. approaching 80 degrees to the normal to the plane of the structure), the hue of the observed colour remains approximately constant. Furthermore, the transition from red to yellow is relatively rapid (i.e. over an approximate 15 degree range). These factors are beneficial for an authentication process, especially by a layperson who may not have the specialist knowledge or skill required for correct observation of the specified colours.

Figure 8A:
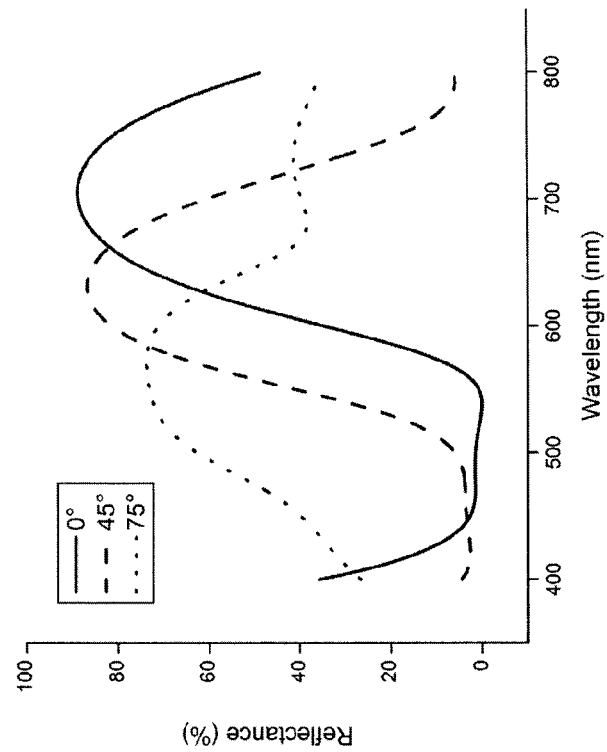
FIGS. 8A and 8B are plots of reflectance as a function of wavelength.
Figure 8B:
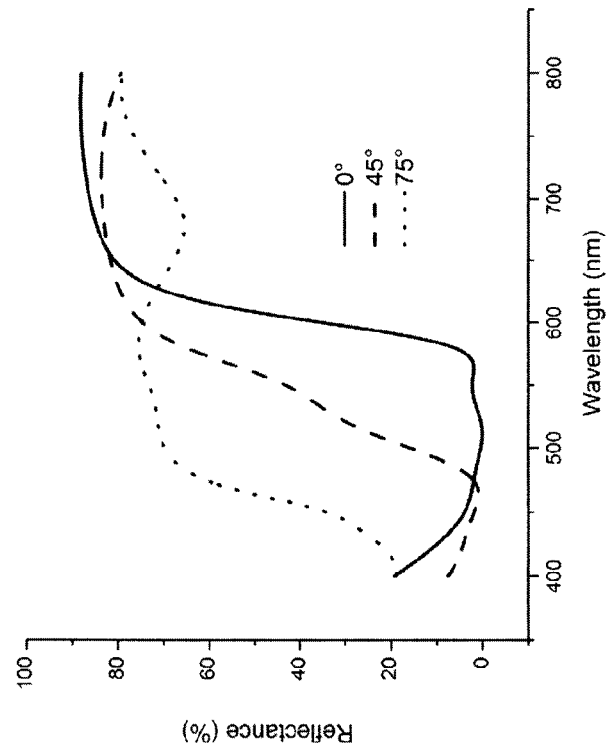

FIGS. 8A and 8B are two graphs showing approximate percentage of light reflectance at different observation angles as a function of wavelength. Structures according to Examples 2, 3, 4 and 5 were shown to exhibit reflectance profiles similar to that of FIG. 8A, while structures according to Example 1 were shown to exhibit reflectance profiles similar to that of FIG. 8B. The actual reflectance profile will depend, for example, in practice on the thickness of each individual layer.

As would be recognized by the skilled person, the refractive index of each layer will depend on the material of the layer as well as the method of deposition used. Therefore, depending on the deposition technique used to form any given layer, a layer of a different thickness but deposited using a different technique may provide a similar or identical optical effect. As would be also recognized by those skilled in the art, the specific thicknesses, materials, and order of the various absorbing, non-absorbing and reflecting layers may be modified, within the bounds of this disclosure, so as to achieve and maintain the red-to-yellow colour variation described herein. The total number of layers used to form the multilayer device may also be varied, within the bounds of this disclosure. Many different possible layer combinations may, within the bounds of this disclosure, be used in order to achieve the desired red-to-yellow colour variation.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A multilayer optical thin film structure comprising:
   multiple optically absorbing layers; and
   multiple optically non-absorbing layers,
   wherein the optically absorbing layers and the optically non-absorbing layers are configured such that visible light incident on the structure is reflected with a red colour at a first angle relative to a normal to a plane defined by the structure, and visible light incident on the structure is reflected with a yellow colour at a second angle relative to the normal to the plane defined by the structure, and
   wherein the first angle is smaller than the second angle.

2. The optical thin film structure of claim 1, wherein the optically absorbing layers comprise semiconducting layers.

3. The optical thin film structure of claim 1, wherein the optically absorbing layers comprise one or more of a metal, a metal alloy, a metalloid, a nitride, amorphous silicon, germanium, and tantalum.

4. The optical thin film structure of claim 1, wherein the optically non-absorbing layers comprise one or more of silicon oxide, aluminium oxide, magnesium fluoride, an oxide, and a fluorite.

5. The optical thin film structure of claim 1, further comprising a bonding layer for bonding the structure to a substrate.

6. The optical thin film structure of claim 1, wherein the structure comprises at least three optically absorbing layers and at least three optically non-absorbing layers.

7. The optical thin film structure of claim 1, wherein the optically absorbing layers and the optically non-absorbing layers are arranged in alternating order.

8. The optical thin film structure of claim 1, further comprising an optically absorbing and reflecting layer.

9. The optical thin film structure of claim 8, wherein the optically absorbing and reflecting layer comprises one or more of a metal, a metal alloy, aluminium, silver, gold, chromium, nickel, and tantalum.

10. The optical thin film structure of claim 8, wherein the structure comprises at least three optically non-absorbing layers.

11. The optical thin film structure of claim 8, wherein the optically absorbing layers and the optically non-absorbing layers are arranged to form a stack, and wherein the optically absorbing and reflecting layer is arranged at an end of the stack.

12. The optical thin film structure of claim 11, wherein one of the optically absorbing layers comprises the optically absorbing and reflecting layer.

13. The optical thin film structure of claim 8, wherein the optically absorbing layers and the optically non-absorbing layers are positioned on one side of the optically absorbing and reflecting layer and form a set of layers, and wherein the structure further comprises an identical set of layers positioned on an opposite side of the optically absorbing and reflecting layer.

14. The optical thin film structure of claim 1, wherein at least one of the optically absorbing layers comprises amorphous silicon and at least one of the optically non-absorbing layers comprises silicon dioxide.

15. The optical thin film structure of claim 1, wherein at least one of the optically absorbing layers comprises germanium and at least one of the optically non-absorbing layers comprises silicon dioxide.

16. The optical thin film structure of claim 8, wherein the optically absorbing and reflecting layer comprises aluminium, at least one of the optically absorbing layers comprises tantalum, and at least one of the optically non-absorbing layers comprises silicon dioxide.

17. The optical thin film structure of claim 8, wherein the optically absorbing and reflecting layer comprises aluminium, at least one of the optically absorbing layers comprises a nitride, and at least one of the optically non-absorbing layers comprises silicon dioxide.

18. The optical thin film structure of claim 8, wherein the optically absorbing and reflecting layer comprises aluminium, at least one of the optically absorbing layers comprises germanium, and at least one of the optically non-absorbing layers comprises silicon dioxide.

19. The optical thin film structure of claim 8, wherein the optically absorbing and reflecting layer comprises chromium, at least one of the optically absorbing layers comprises amorphous silicon, and at least one of the optically non-absorbing layers comprises silicon dioxide.

20. The optical thin film structure of claim 1, wherein the first angle is comprised between about 0 degrees relative to the normal to the plane defined by the structure, and about 28 degrees relative to the normal, and wherein the second angle is comprised between about 45 degrees relative to the normal, and about 80 degrees relative to the normal.

21. The optical thin film structure of claim 1, wherein the optically absorbing layers and the optically non-absorbing layers are further configured such that, as an angle of reflection of visible light incident on the structure varies from the first angle to the second angle, a degree of yellow in the reflected light increases and a degree of red in the reflected light decreases.

22. The optical thin film structure of claim 1, wherein the optically non-absorbing layers comprise dielectric layers.

23. A method of securing an item so as to inhibit or prevent counterfeiting of the item, comprising applying to the item a multilayer optical thin film structure according to claim 1.

24. An item having applied thereto a multilayer optical thin film structure according to claim 1, wherein the item comprises one or more of a bank note, a document, a passport, an identification card, a bank card, and a valuable good.

25. The optical thin film structure of claim 1, wherein the red colour is in a red colour region of a 1931 CIE chromaticity diagram.

* * * * *